US 6,552,713 B1

(12) United States Patent
Van Brocklin et al.

(10) Patent No.: US 6,552,713 B1
(45) Date of Patent: Apr. 22, 2003

(54) OPTICAL POINTING DEVICE

(75) Inventors: Andrew L Van Brocklin, Corvallis, OR (US); Glen A Oross, Corvallis, OR (US); James F Bausch, Salem, OR (US); Gregory J May, Corvallis, OR (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/465,503

(22) Filed: Dec. 16, 1999

(51) Int. Cl.[7] .............................. G09G 5/08; G09G 5/00
(52) U.S. Cl. ...................... 345/157; 345/156; 345/167; 345/160; 345/168
(58) Field of Search ................................ 345/156, 157, 345/158, 163, 166, 167, 168

(56) References Cited

U.S. PATENT DOCUMENTS

| 4,257,670 A | 3/1981 | Legrand ........................ 350/8 |
| 4,647,771 A | 3/1987 | Kato ........................ 250/237 R |
| 4,751,505 A | 6/1988 | Williams et al. ............. 340/710 |
| 4,799,055 A | 1/1989 | Nestler et al. ............... 340/710 |
| 4,807,166 A | 2/1989 | Zalenski ...................... 364/571 |
| 4,857,903 A | 8/1989 | Zalenski ...................... 340/710 |
| 4,920,260 A | 4/1990 | Victor et al. ................. 250/221 |
| 4,922,236 A | 5/1990 | Heady ........................ 340/710 |
| 5,078,470 A | 1/1992 | Milman ....................... 359/629 |
| 5,424,756 A | * | 6/1995 | Ho et al. ..................... 345/158 |
| 5,432,530 A |   | 7/1995 | Arita et al. .................. 345/159 |
| 5,463,387 A |   | 10/1995 | Kato ........................... 341/31 |
| 5,691,898 A | * | 11/1997 | Rosenberg et al. ......... 345/161 |
| 5,694,123 A | * | 12/1997 | Selker et al. ................. 341/20 |
| 5,801,681 A | * | 9/1998 | Sayag ........................ 345/157 |
| 5,825,308 A | * | 10/1998 | Rosenberg ................... 341/20 |

OTHER PUBLICATIONS

Hewlett–Packard Company: "Solid–State Optical Mouse Sensor With PS/2 And Quadrature Outputs—Application Note", HDNS–2000, 2100, 2200, Revision 1.0, May 20, 1999, pp. 1–11 (including Errata sheet).

Hewlett–Packard Company, "Solid–State Optical Mouse Sensor With PS/2 And Quadrature Outputs—Technical Data", HDNS–2000, Revision 1.0, May 20, 1999, pp. 1–9 (including Errata sheet).

\* cited by examiner

Primary Examiner—Amare Mengistu
Assistant Examiner—Jimmy H Nguyen
(74) Attorney, Agent, or Firm—Timothy F. Myers

(57) ABSTRACT

An electronic device has a case and a screen attached to the case. The screen indicates a cursor position. The electronic device further has an input device mounted to the case. The input device includes a curved surface for detecting an object disposed on the curved surface using a light path that transfers an image of the object to an optical sensor. The optical sensor detects the movement of the object across the curved surface and in response, the input device manipulates the cursor position.

15 Claims, 12 Drawing Sheets

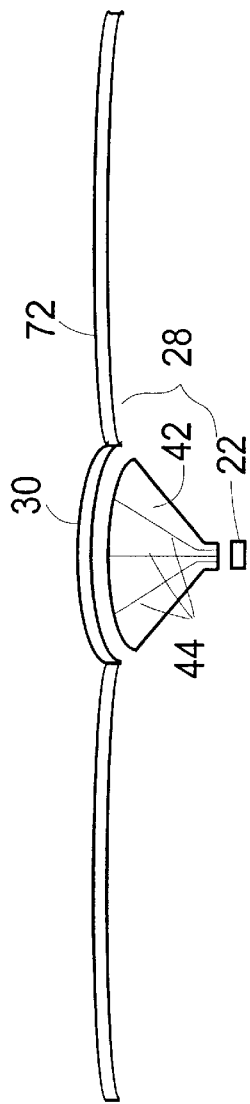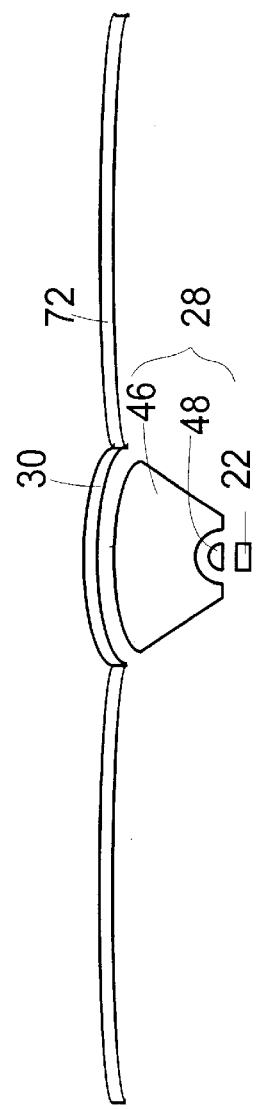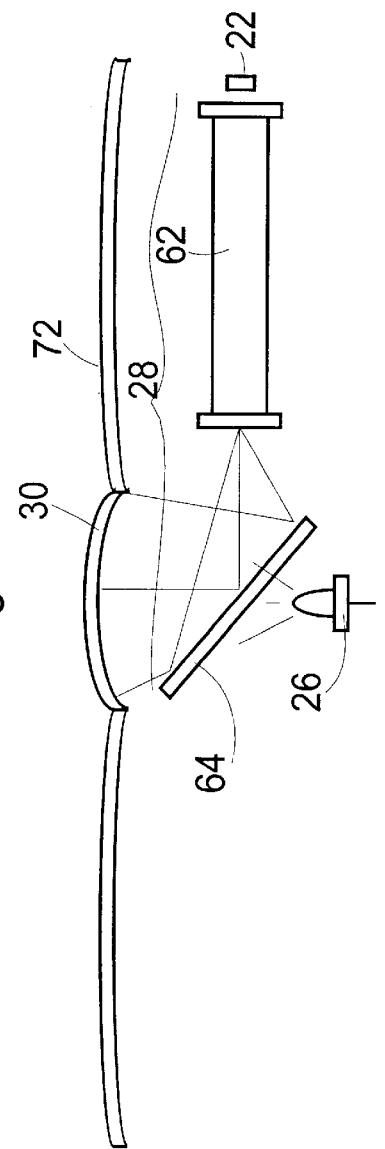

OPTICAL POINTING DEVICE

FIELD OF THE INVENTION

The invention relates to a cursor control device, more specifically, the invention relates to an optical pointing device that controls cursor movement on a screen in an electrical device.

BACKGROUND OF THE INVENTION

A mouse is a computer input device used for positioning a cursor on a computer video display. A typical embodiment of a mouse includes an enclosure that lies flat on a work space, one or more user-actuated switches or buttons located externally of the enclosure, X and Y motion sensors, electrical interface circuitry, and a cable to connect the mouse to a host computer and video display. The switches, often in the form of push buttons, enable alteration of the program flow in the host computer. In operation, when the user moves the mouse on a flat surface, the motion sensors sense the movement in the directions of the X and Y planes. The interface circuitry, typically located within the mouse enclosure, converts the raw movement and switch information into digital information, which is supplied to the host computer. Software in the host computer uses the motion and switch information to perform different functions, for example, repositioning the cursor on the computer display screen.

Mice of the above described type are normally classified by the manner in which the motion is detected, the principal motion detection methods being mechanical and optical. Mechanical mice usually employ a technique whereby a spherical ball protrudes slightly below the bottom of the mouse enclosure and is free to roll as the user along a flat and level drawing surface moves the mouse. Inside the enclosure, the rolling ball is coupled to a pair of orthogonally mounted shaft position encoders. The mechanical mouse motion is thereby converted by the encoders into two pairs of quadrature signals, one pair for each axis of motion, thereby providing the required direction and displacement information corresponding to the mouse movement.

The mechanical mouse requires that both the ball and the enclosure be in contact with the drawing surface. This limits the mechanical mouse to use on an essentially level surface so that the ball is held against the drawing surface by gravity. In addition, due to the limits at which the ball can travel in and out of the enclosure, it will not function properly, if at all, on curved surfaces. Another limitation of the mechanical mouse is that when in the process of lifting the mouse or when pressing the mouse into a soft surface, the orthogonally mounted encoding shafts detect a ball position change with respect to the enclosure, false position data can be sent to the host computer. A further limitation is that oil, grease, hair, or dirt can cause the ball to become stuck or to not rotate freely again causing false position data to be sent to the host.

Optical mice utilize a light source in the base of the mouse enclosure, light therefrom being reflected onto one or more photodetectors from a specifically patterned grid surface over which the mouse is moved. Typically, a single chip computer translates the changes in detected luminance into direction and displacement information, which is utilized by the host computer in the manner described above. Like mechanical mice, an optical mouse requires an essentially flat level surface in order to provide proper focus.

Other input devices are used in electronic devices. For portable devices, input devices that can be controlled by a finger are preferred. Trackpads are input devices that have flat surfaces and detect finger movement by either resistive or capacitive sensing technologies. Trackballs are essentially upside down mice thereby allowing the user to use a finger to rotate the ball. While trackballs are well liked by users, the limitations of the optical mice also apply and often the ball becomes stuck and does not rotate freely causing poor cursor positioning. Trackpoints™ are pressure sensing pointing devices that use the force exerted by a finger to direct movement. While the small size of the trackpoint is beneficial in some products, users complain about the difficulty in finding the correct force to apply and the trackpoint's tendency to drift. Therefore, there is a need for an ergonomic input device technology that is reliable.

SUMMARY

An electronic device has a case and a screen attached to the case. The screen indicates a cursor position. The electronic device further has an input device mounted to the case. The input device includes a curved surface for detecting an object disposed on the curved surface using a light path that transfers an image of the object to an optical sensor. The optical sensor detects the movement of the object across the curved surface and in response, the input device manipulates the cursor position.

BRIEF DESCRIPTION OF THE DRAWINGS

FIG. 5 is an exemplary illustration of an embodiment of a light path incorporating a fiber optic bundle.

FIG. 6 is an exemplary illustration of a first alternative embodiment of a light path using a wide-angle lens.

FIG. 7 is an exemplary illustration of a second alternative embodiment of a light path using a peephole fish-eye wide-angle lens.

DETAILED DESCRIPTION OF THE PREFERRED AND ALTERNATE EMBODIMENTS

Figure 1:
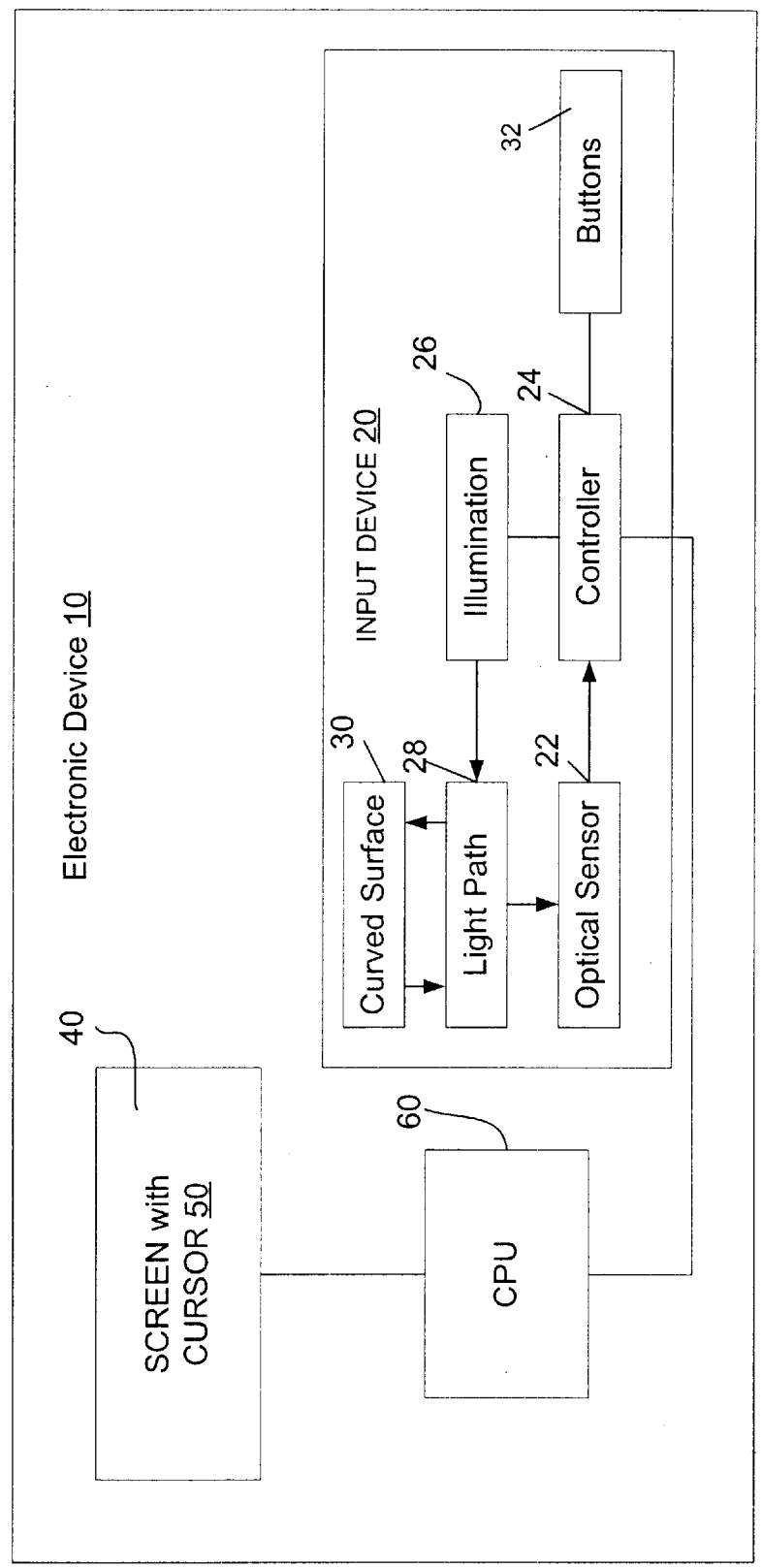
FIG. 1 is a block diagram of an electronic device incorporating an embodiment of the invention.

The invention encompasses an optical pointing device that increases user comfort, device ergonomics, and overall product usability. The invention preferably senses a user's finger moving on a curved surface although other objects having a random or pattern exterior can be used. The surface is preferably convexly "curved" to allow for a similar feel as a trackball-pointing device. The surface may also be curved in a concave fashion similarly to a computer keyboard key. In one embodiment, a wide-angle lens captures the image of the user's finger on the curved surface. An optical motion sensor computes the direction and amount of motion detected by the movement of the finger. The finger is detected as moving against a blank background or alternatively, the texture (e.g. fingerprint) of the finger is detected and used to determine finger movement.

Preferably, the surface used to support the user's finger is a domed shaped (convex) curved surface. The domed surface is preferably either molded or inflated into one of several novel shapes. By being inflatable, the surface response pressure felt by the finger is adjustable by the user to provide optimum comfort, feel, and response. Alternatively, the domed surface is formed from a silicon gel filled flexible container. Additionally, the domed surface is optionally illuminated to not only help detect the finger movement but also to provide for a novel appearance for the product by providing a soft glowing surface. The illumination also allows for operation in the dark. The illumination is also envisioned as being capable of use as an indicator, a warning signal, or communication port. The size and shape of the optical pointing device is selectable to allow a designer to mimic traditional pointing devices such as trackpads, trackpoints™, and trackball devices. The optical pointing device is also preferably, but optionally, able to emulate the effect of trackball "rotational inertia". By emulating the trackball rotational inertia, less finger movement is required by the user. The optical pointing device is able to provide this trackball functionality in a very small space, thus allowing for its use in several electronic devices such as notebook computers, palmtops and personal data assistants, to name a few.

The optical pointing device provides higher reliability over trackball devices while remaining very sensitive to finger movements because there are no rotating parts that can become dirty and cause sticking.

Other aspects of the invention provide additional features that may be optionally included in any given embodiment. If implementing a trackpoint™ type device, the physical design may be selected to be similar to a trackpoint™ or optimized for ergonomic feel and use. One such ergonomic design is to make the optical pointing device T-shaped. The T-shape allows the user to easily direct the cursor in vertical and horizontal directions.

Another optional aspect of the invention is to allow detection of a change in ambient light condition to provide additional functions. One exemplary embodiment detects the changed light condition as detecting when a finger is removed or placed on the optical pointing device. If the finger is detected as removed, the cursor position is locked to prevent drifting as commonly occurs with conventional pointing devices. If the rotational inertia feature is implemented, the cursor position is locked after a short delay period due to the rotational inertia. Another exemplary embodiment senses a changed light condition to detect the opening and closing of a notebook computer's display screen. This detected state is then used to turn on/off either the display or the notebook power as appropriate for the application. An additional optional aspect of the invention is to incorporate the optical pointing device into a key or button used on the electronic device. The key is made movable or not depending on the desired function of the key. If the key is made moveable, the key can be used either to activate the optical pointing function of the key when pressed, or to operate as part of a traditional pointing device button function. The key may have a concave, convex, or flat surface.

Another optional aspect of the invention is to allow the optical pointing device to be removable from the electronic device and be incorporated into an external mouse-pointing device. In one embodiment, the remote mouse incorporating the optical pointing device can dock into the electronic device. When docked, the mouse is positioned to allow the optical pointing device to be used as a built-in pointing device by the user of the electronic device. Thus, the user is able to choose either an integrated pointing device or a traditional mouse-pointing device depending on the user's current operating environment.

Additional aspects of the invention will become apparent in the following description of exemplary embodiments of the invention.

FIG. 1 is a block diagram of an exemplary embodiment of the invention. An electronic device 10 has an input device 20 that is connected to a central processing unit (CPU) 60. CPU 60 is further connected to a screen 40, which has a cursor 50. The position of cursor 50 is controlled with input device 20. Input device 20 has a controller 24, such as a microprocessor, microcontroller, or digital signal processor. The controller 24 reads signals from an optical sensor 22 to determine cursor movement. The optical sensor 22 receives light from a curved surface 30 through a light path 28. A change in the light pattern from curved surface 30 received by the optical sensor 22 is used to derive the direction, speed, and acceleration of the movement of cursor 50. Preferably, but optionally, a source of light, illumination 26, is provided to ensure a quality light pattern on optical sensor 22. Controller 24 is also connected to buttons 32 that allow for conventional mouse control functions.

Figure 2:
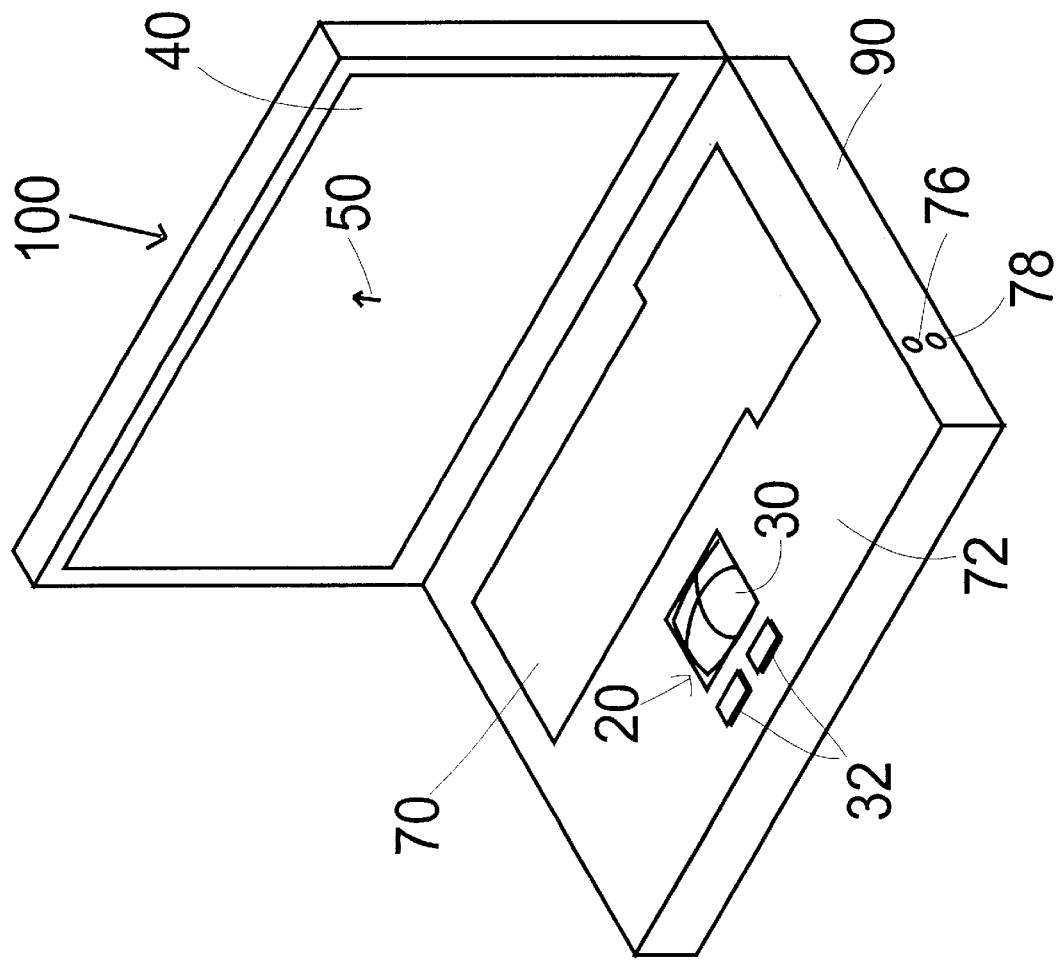
FIG. 2 is an illustration of an embodiment of an electronic device incorporating the invention.

FIG. 2 is an electronic device, a notebook computer 100, that incorporates an embodiment of the invention. Input device 20 is built into the case 90 of notebook computer 100. Input device 20 preferably has a curved surface 30 that can be inflated with inflate button 76 and deflated with deflate button 78. Optionally, the inflate/deflate functions may be incorporated into a single button or control. Preferably, the inflate button 76 is connected to a small pump to pressurize the area beneath the curved surface 30. Preferably, the deflate button 78 is connected to a valve that releases the pressure from the area under the curved surface 30. Preferably, the curved surface 30 is inflatable and deflatable to allow the curved surface 30 to be extended higher than palmrest 72 and still be recessed within palmrest 72 to allow the display 40 to close flush with case 90. The input device 20 further has buttons 32 that provide conventional mouse control functions. The input device 20, along with keyboard 70 allows for control of the position and movement of cursor 50 on the screen 40.

Figure 3:
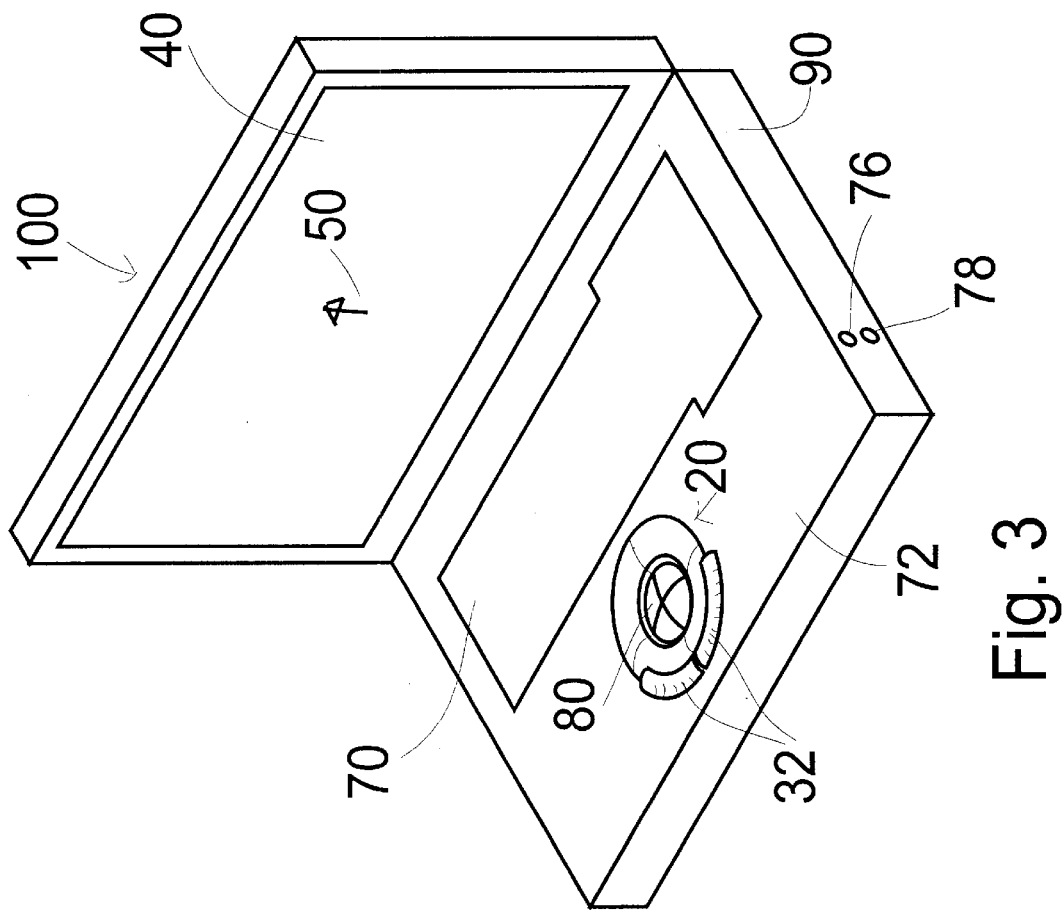
FIG. 3 is an illustration of a first alternative embodiment of an electronic device incorporating the invention.

FIG. 3 is a first alternative embodiment of the invention incorporated into notebook computer 100 and similar to FIG. 2. However, in this embodiment, the input device 20 is shaped to appear similar to a trackball device. Rather than having a rotating surface as in a trackball, the input device 20 has a round curved surface 80, preferably inflatable/deflatable, but optionally solid or gel filled.

Figure 4:
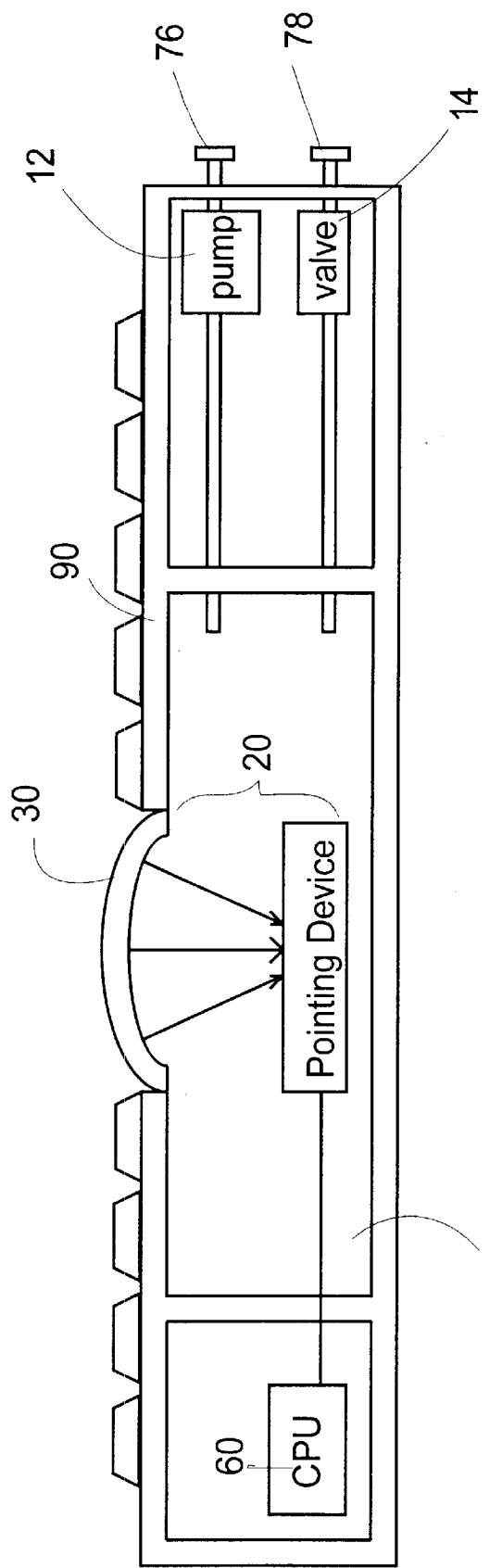
FIG. 4 is an exemplary illustration of a cavity incorporating one aspect of the invention.

FIG. 4 illustrates an airtight cavity 74 within the case 90 of the notebook computer 100 that incorporates a pointing device 20 connected to CPU 60, which is preferably outside the cavity 74. The cavity 74 is airtight to allow a pump 12 activated by pump button 76 to pressurize the cavity 74. When the cavity 74 is pressurized, the curved surface 30 is inflated to create a domed shape. The dome curvature and tension is thus adjustable by the user. The user releases pressure within the cavity 74 by using valve 14 via valve button 78 to vent air from within the cavity 74.

FIGS. 5–7 are exemplary illustrations of different embodiments of the light path 28 of the input device 20 in FIG. 1. Light path 28 transfers an image on the curved surface 30 of palmrest 72 to optical sensor 22 of input device 20.

FIG. 5 is a first alternative embodiment of light path 28 using a fiber optic bundle 42, also known as a fiber optic taper. In this embodiment, a structure is formed of a multitude of tiny optical fibers 44 that are substantially parallel to each other (but optionally flared to provide image size adjustment) so that the optical fibers 44 transmit light in an orderly fashion to transfer an image. An image focused on the end near curved surface 30 is transferred fiber by fiber to the other end near optical sensor 22. Each end of fiber optic bundle 42 is preferably planar polished to maximize light transfer. The structure is machined to conform to the mechanical configuration of the curved surface 30 and the optical sensor 22. Curved surface 30 is preferably a translucent plastic membrane attached to palmrest 72 or keyboard 70, although other locations on the notebook computer 100 are possible. Curved surface 30 preferably also provides a light filtering function to restrict the frequency of the ambient light that reaches optical sensor 22.

FIG. 6 is a second alternative embodiment of the light path 28 using a wide-angle lens 46 with a secondary-focusing lens 48. This implementation uses conventional optics to transfer an image on curved surface 30 to the optical sensor 22.

FIG. 7 is a third alternative embodiment of the light path 28 preferably using a partially reflecting mirror 64 to redirect the image on curved surface 30 to the optical sensor 22 using a 30 peephole lens 62. Peephole lens 28 is a multi-element wide-angle lens. Optionally, illumination 26, preferably at least one LED, is used to provide a light source. Preferably, illumination source 26 has a substantially a single frequency to achieve the best resolution by optical sensor 22.

Figure 8:
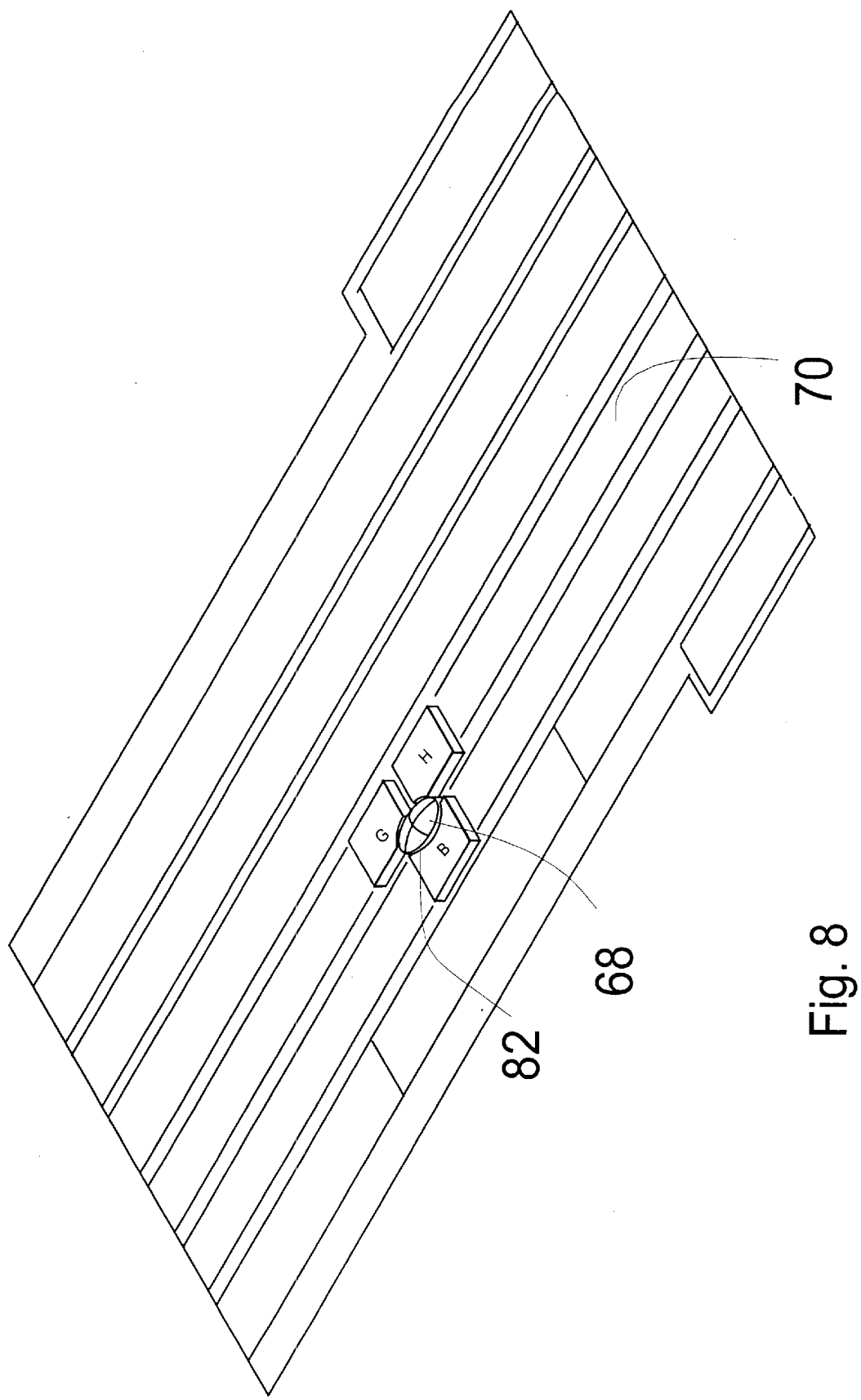
FIG. 8 is a second alternative embodiment of the invention wherein the input device is incorporated into a keyboard of the electronic device.

FIG. 8 is a second alternative embodiment of the invention that is illustrated as implementing a "trackpoint™" like device. In this embodiment, a trackpoint™ sized curved surface 82 is used to implement an oval input device 68 in keyboard 70 preferably between the G, H, and B keys. The location of the oval input device 68 can change, such as locating the device on the palmrest and still maintain the spirit and scope of the invention. In this exemplary embodiment, a solid curved surface is preferable and the optics of light path 28 are preferably implemented using the fiber optic bundle 42 of FIG. 5.

Figure 9:
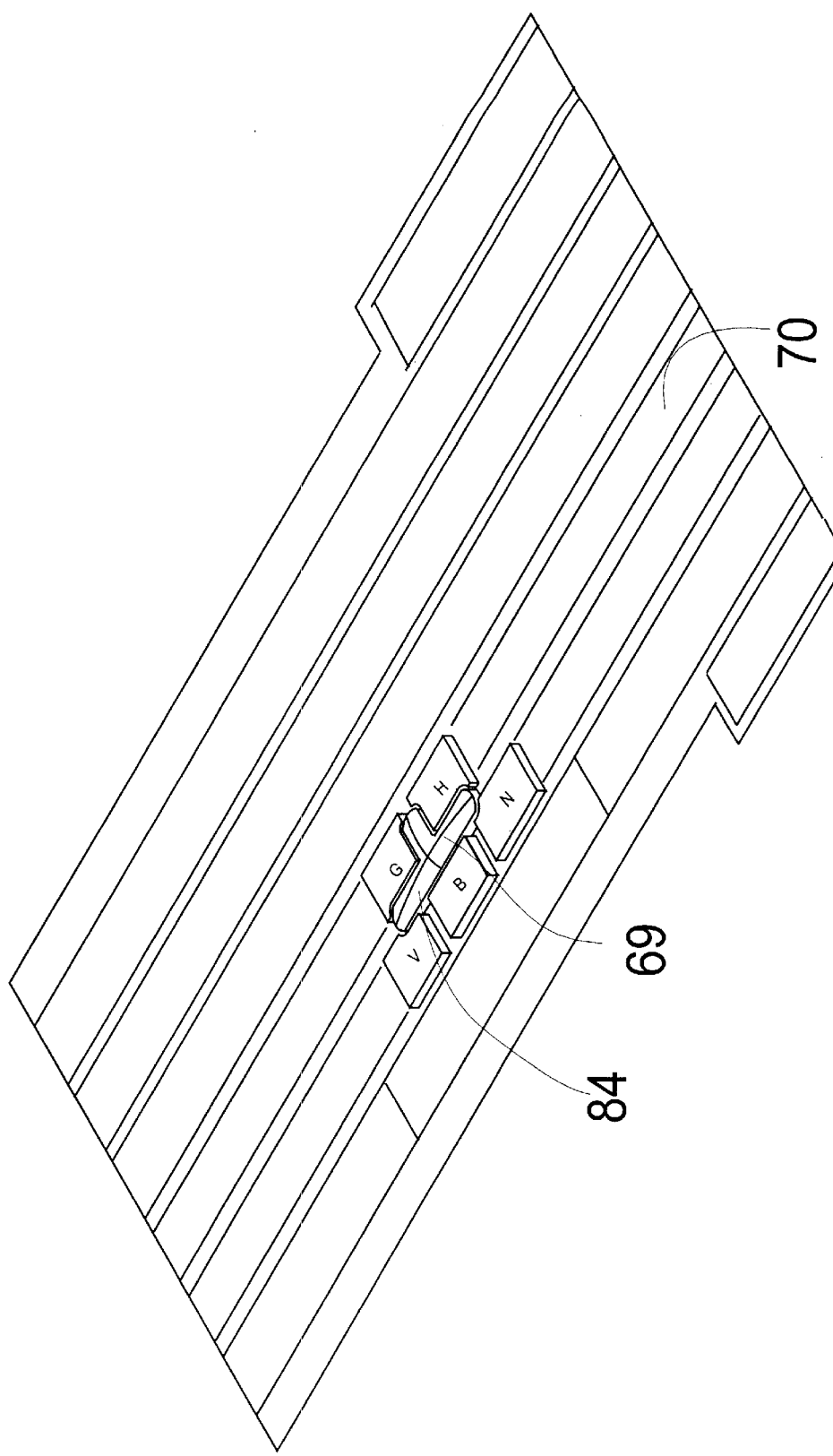
FIG. 9 is a third alternative embodiment of the invention wherein the input device is T-shaped.

FIG. 9 is a third alternative embodiment of the invention shown as a T-shaped input device 69 having an elongated-curved surface 84. This T-shaped device is preferably located between the G, H, V, B, and N keys in keyboard 70. The location of the T-shaped input device 20 can be changed and still maintain the spirit and scope of the invention. The T-shape provides a larger surface area in the X and Y directions to allow the user to achieve finer positional control of the cursor. Further, with at T-shaped device, a simple optical sensor can be used to just have one row and one column of sensors be used rather than a full matrix.

Figure 10:
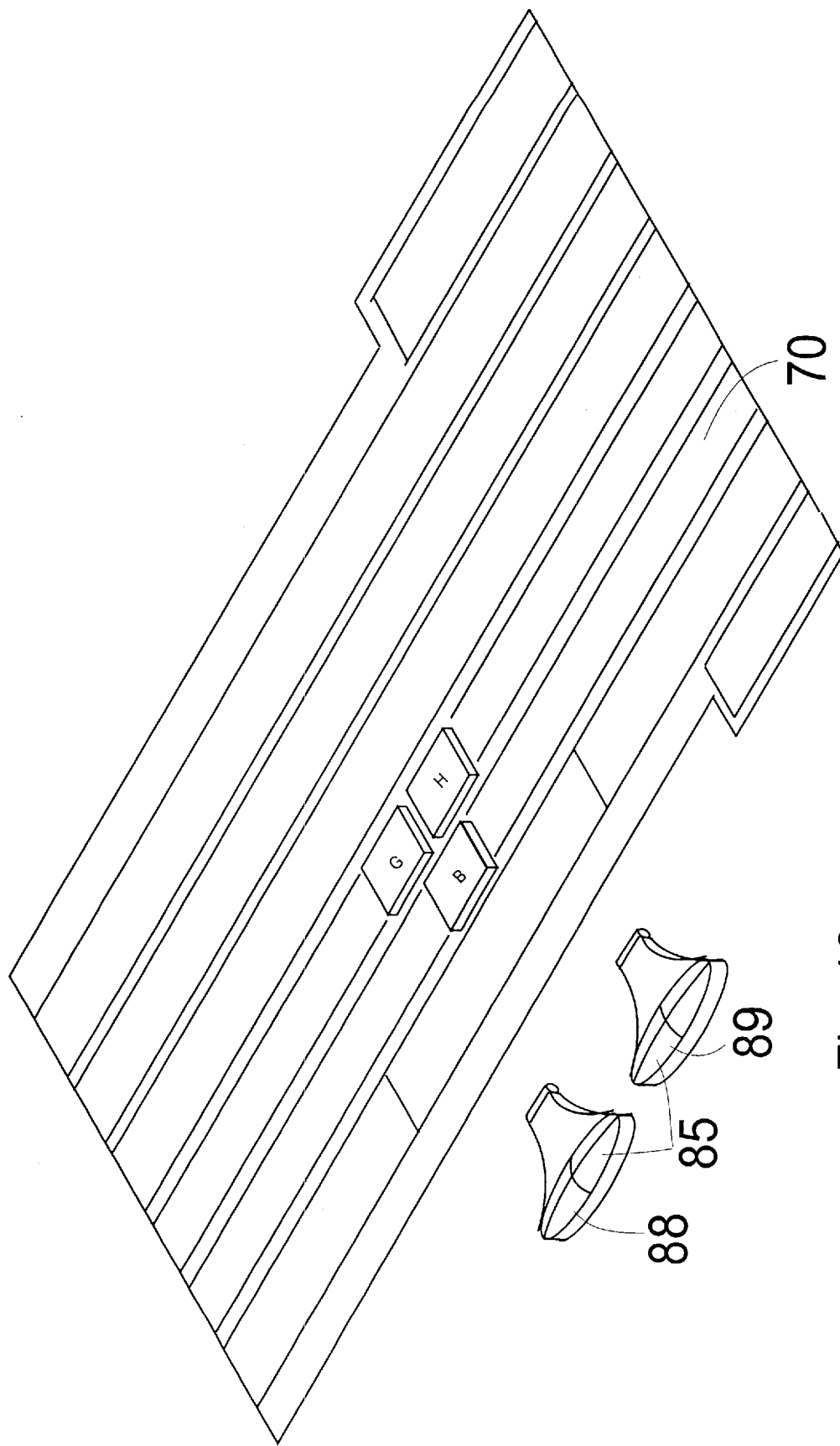
FIG. 10 is a fourth alternative embodiment of the invention wherein the input device is incorporated into at least one key.

FIG. 10 is a fourth alternative embodiment of the invention that incorporates at least one input device of the invention into a key or button structure having a key-shaped curved surface 85. In this exemplary embodiment, the input device buttons 88 and 89 are separated from keyboard 70 but optionally could be incorporated into keyboard 70. Preferably, the input device buttons 88 and 89 also incorporate both the optical input device function as well as a separate mouse (input device) button function. The optical input device function is operative whether the key is pressed or not. When the key is pressed, however, the mouse button function is activated. Preferably, both input device buttons 88 and 89 are designed to allow for being independent optical input devices. In this exemplary implementation, input device button 88 is used to provide cursor control and a left click mouse function. Input device button 89 is used to provide vertical and horizontal scrolling functions on the screen and a right click mouse button function.

Figure 11:
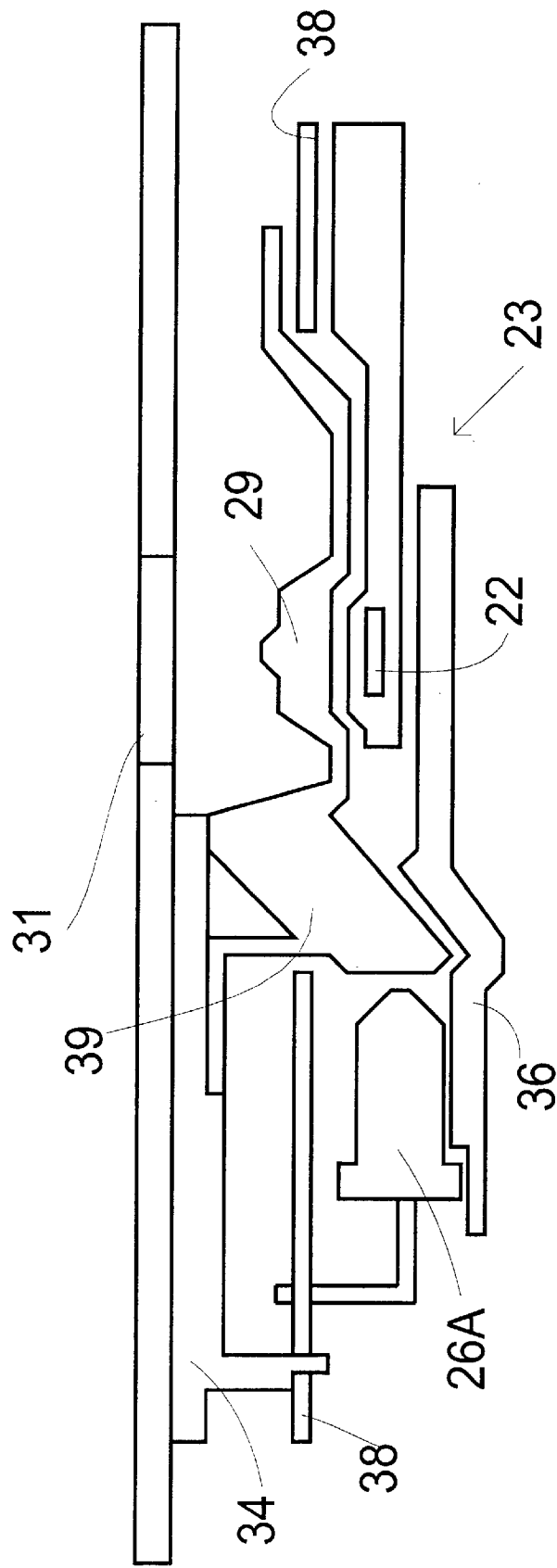
FIG. 11 is an exemplary illustration of incorporating a conventional optical sensor into the invention.

FIG. 11 is a cross section of an optical sensor manufactured by Hewlett-Packard (HP) that has been adapted for use in several of the embodiments of the invention. The HP optical sensor 23 has a sensor 22 (HDNS-2000) in an integrated circuit package that is mounted to a printed circuit board 38. The printed circuit board (PCB) 38 also includes a light emitting diode (LED) 26A (HLMP-ED80) that provides illumination. The PCB 38 is mounted to a holder 34. The LED 26A and sensor 22 are held in place with a clip 36 (HDNS-2200). A clear molded plastic piece provides a lens 29 for the sensor 22 and a light pipe 39 for LED 26A. The lens 29 focuses an image from a flat surface 31 onto the sensor 22. The light pipe 39 couples and directs light from LED 26A to the flat surface 31 at an angle that maximizes contrast.

The HDNS-2000 is a low cost reflective optical sensor that provides a non-mechanical tracking engine for implementing a standard mouse. It is based on optical navigation technology that measures changes in position by optically acquiring near-field sequential images and mathematically determining the direction and magnitude of movement. The sensor is mounted in a 16 pin optical dual-in-line package and is designed to be used with the HDNS-2100 lens (lens 29 and light pipe 39), the HDNS-2200 clip (clip 36) and the HLMP-ED80 5 mm red light emitting diode (LED 26). The previously mentioned components provide a compact tracking engine. This tracking engine has no moving parts and requires no precision assembly or optical alignment. Further, the optical sensor provides an electrical interface that provides for PS/2 or quadrature output modes for connection to CPU 60. Resolution of the sensor is at least 400 counts per inch at rates of motion up to 10 linear inches per second.

Unlike traditional mice, the HDNS-2000 does not make contact with the surface. It acquires subsequent images of the surface to calculate $\Delta X$ and $\Delta Y$ relative displacement values. The navigation requirements for the optical engine are a flat reflecting surface with random texture or pattern characteristics. The sensor uses the microscopic features of the surface to register motion. These features may come from fine texture in the surface and/or from color contrast. The sensor acquires surface images and compares successive images to determine motion. Surfaces with random textures or pattern features work well with the sensor. Thus there is no need to require special precision patterns that reflect light off a grid pattern onto photodetectors to track motion.

Figure 12:
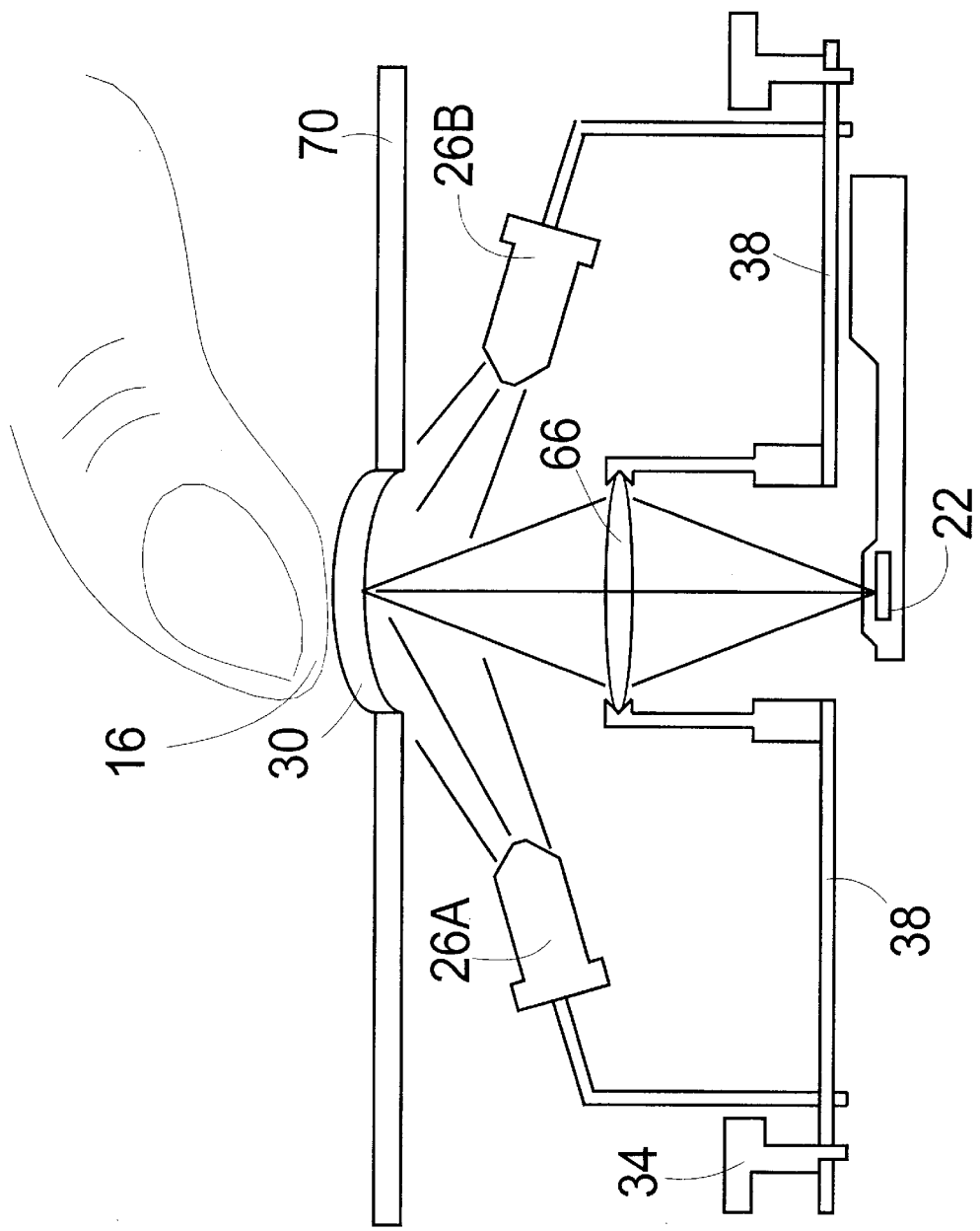
FIG. 12 is an exemplary illustration of the embodiment of FIG. 8.

FIG. 12 is an exemplary illustration of a trackpoint™ embodiment of the invention that uses the HP optical sensor. The sensor 22 is mounted to a printed circuit board 38 (PCB)

which has an opening to allow light to contact the sensor 22. The PCB 38 is attached to a mount 34. An LED 26A is attached to the PCB 38 to provide illumination. The LED 26A emits light or infrared energy onto curved surface 30. Curved surface 30 is preferable a thin clear surface made of glass, quartz, or plastic that is integrated into the keyboard 70 or optionally another case 90 location such as palmrest 72. When a user places a finger 16 on curved surface 30, the fingerprint image from the finger on the curved surface 30 is focused by a mounted lens 66 onto the optical sensor 22. The optical sensor 22 is then able to detect movement and generate the appropriate PS/2 signals to CPU 60 (see FIG. 1). Optionally, a second LED 26B is used to provide additional illumination, or alternatively a different color than LED 26A to allow for a separate warning function.

Figure 13:
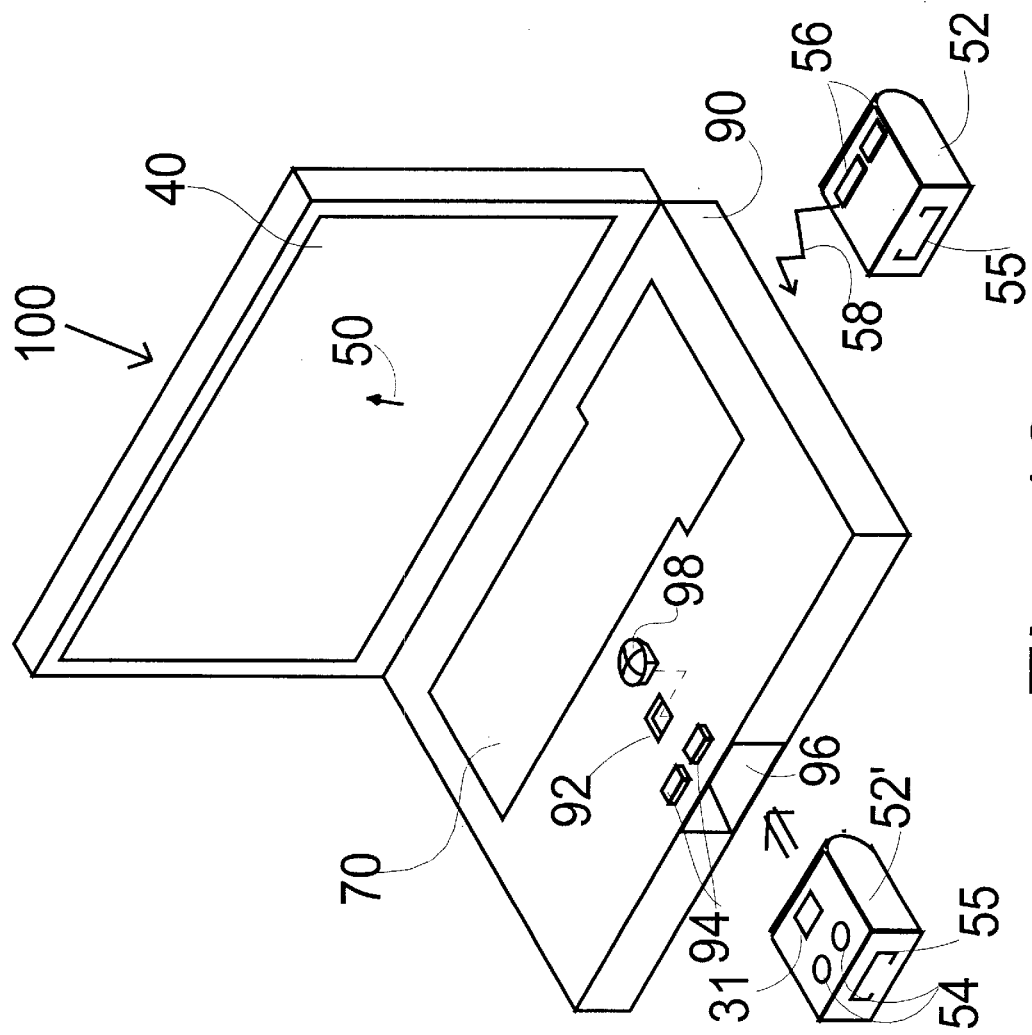
FIG. 13 is an exemplary illustration of a fifth embodiment of the invention wherein the input device is removable.

FIG. 13 is an illustration of another embodiment of the invention in which the pointing device is incorporated into a mouse package that is insertable and removable from a notebook computer 100. The upright positioned mouse 52 is preferably in wireless contact with notebook computer 100 using a wireless link 58. The wireless link is supplied using preferably a Bluetooth™ compatible device or IRDA™ compliant infrared device. Optionally, a wire cable can be used to connect the mouse to the notebook computer. The upright positioned mouse 52 has buttons 56 used for entering mouse command functions and preferably, a handle 55 used to remove the mouse from the notebook computer 100.

The upside down mouse 52' illustrates a flat surface 31 and additional buttons 54 that replicate the functions of buttons 56 but are not activated when the mouse is used in the upright position. The upside down mouse 52' is inserted into notebook computer 100 in mouse bay 96. The case 90 has an opening 92 to allow the user to access the flat surface 31 of the inserted upside down mouse 52'. The case 90 also has case buttons 94 that are mechanically hinged to activate the additional buttons 54 on the inserted upside down mouse 52'.

Preferably, a curved surface 98 is provided by using a fiber optic bundle relay device made up of a bundle of fiber optic fibers-to move the image from the curved surface to the flat surface 31 of the mouse.

Figure 14:
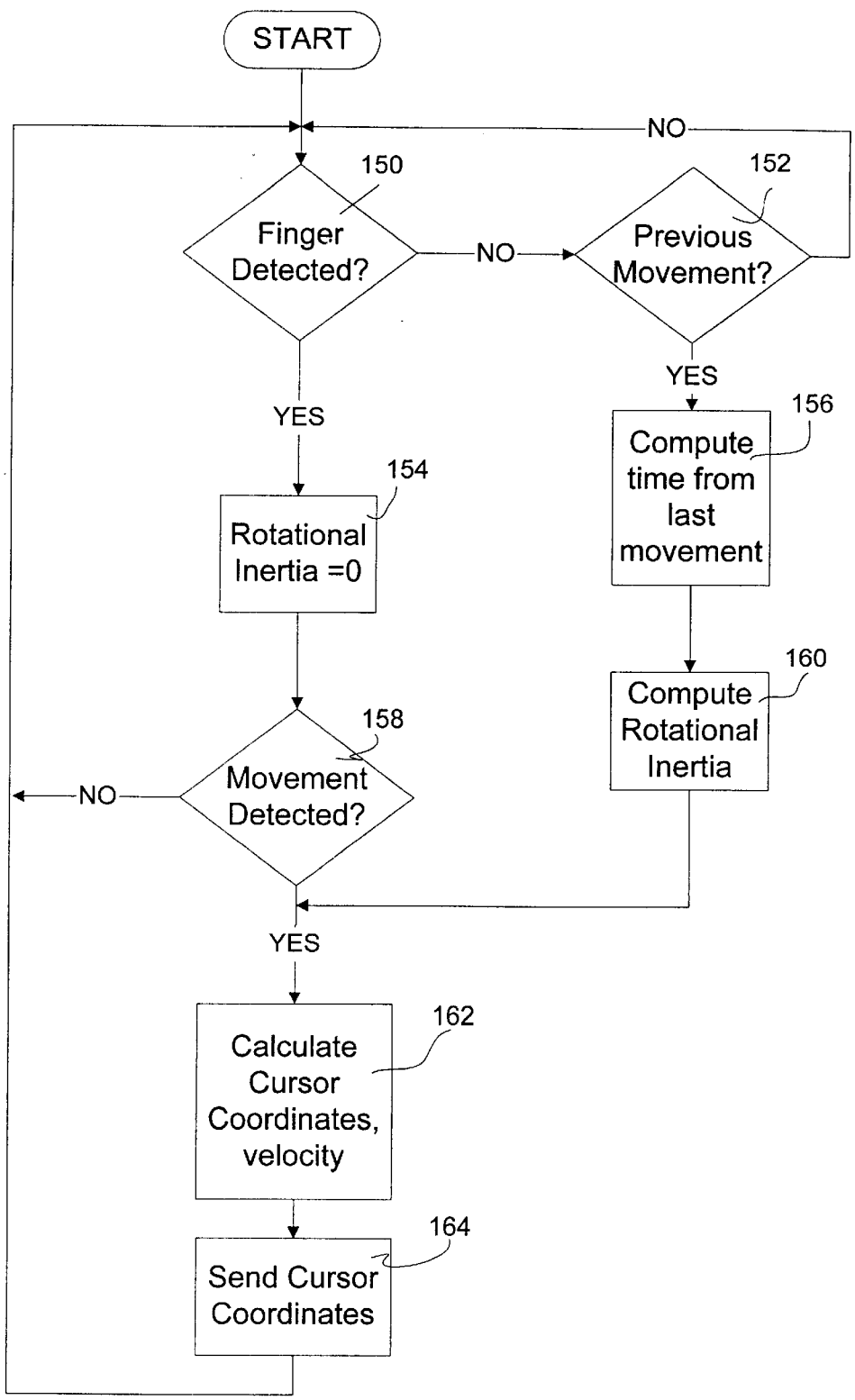
FIG. 14 is a block diagram of a software subroutine that provides emulation of rotational inertia into the pointing device.

FIG. 14 is a flowchart of a software subroutine that modifies the data stream coming from an HP optical sensor 23 (or other input device) on the PS/2 interface. The subroutine provides for emulation of "rotational inertia" such as that found in a trackball device. When a trackball device is used as a pointing device, the user moves a cursor position on a screen by rotating a small ball. When the ball is rotated due to its momentum and inertia, when the user releases the ball, it continues to rotate until friction causes the rotation to stop. This rotational inertia allows the user to "spin" the ball to cause the cursor position to move quickly across the screen. When the cursor is near the user's desired position, the user simply places a finger on the rotating ball to cause it to stop. This rotational inertia feature is absent in trackpad and trackpoint™ type devices.

One aspect of the invention is to provide the option of including rotational inertia to any of the different embodiments. This rotational inertia feature is preferably provided by means of a software subroutine that receives the PS/2 cursor control commands and modifies them before passing them on to the CPU in the electronic device. The software subroutine is preferably stored in computer executable memory attached to the CPU and executed as a device driver to the Windows™ operating systems. Optionally, the rotational inertia function can also be incorporated into the firmware code of the optical sensor itself.

The software subroutine starts by checking in block 150 to see if an optical sensor detects an object, such as a finger. If a finger is detected then rotational inertia is set to zero in block 154. This action is analogous to a finger being placed on a trackball to stop it from rotating by itself and allows the finger to control the movement of the ball. Next, the routine checks to see if finger movement is detected in block 158. If no movement is detected control returns to block 150. Returning to block 150, if no finger was detected then control passes to block 152 that checks to see when there has been previous movement of the finger. If no movement has occurred, control passes back to block 150 to wait for a finger to be detected. If there has been previous movement, then in block 156, the time from the previous movement is computed. In block 160, the computed time is used to compute the rotational inertia. The rotational inertia value is based on the previous velocity between previous actual finger movements and an exponential decay factor based on time from the last movement when the finger was removed from the pointing device and a frictional component, i.e. rotational inertia=velocity*exp(−time/friction component). The exponential decay factor provides the friction component to allow the emulated ball to stop rotating if a finger is not placed back on the pointing device. Therefore, the faster a user moves a finger across the pointing device, the faster the velocity calculated and the longer the emulated ball rotates before coming to a stop due to the rotational inertia. The friction component either is fixed by the software routine or is programmable by the user. Control is then passed to block 162.

If movement is detected in block 158 or control is passed from block 160, then in block 162 the modified cursor coordinates are calculated to include the rotational inertia. Finally, in block 164, the modified cursor coordinates are sent to the CPU and control returns to block 150.

By providing for a curved input device using optical sensor technology, a reliable and ergonomic solution is provided to users of electronic devices. Although several different embodiments have been described and illustrated, the invention is only limited by the following claims.

What is claimed is:

1. An electronic device, comprising:
    a case;
    a screen capable of indicating cursor position, said screen attached to said case;
    a keyboard formed from an array of individual keys;
    an input device disposed between at least two individual keys wherein said input device is T-shaped, said input device including:
        a curved surface for detecting an object disposed on said curved surface;
        an optical sensor for detecting movement of the object;
        a light path capable of transferring an image of the object to said optical sensor, wherein said input device is capable of manipulating said cursor position; and
        a software subroutine capable of manipulating the cursor position by emulating rotational inertia based on the movement of the object on said curved surface.

2. The electronic device of claim 1 wherein said curved surface is dome shaped.

3. The electronic device of claim 1 wherein said input device is capable of detecting when the object is no longer disposed on said curved surface.

4. The electronic device of claim 3 wherein said input device is capable of locking the cursor position upon detecting when the object is no longer disposed on said curved surface.

5. The electronic device of claim 1 wherein said input device further includes an illumination source and wherein said curved surface is capable of being illuminated with said illumination source.

6. The electronic device of claim 5 wherein said illumination source comprises at least one visible color.

7. The electronic device of claim 5 wherein said illumination source includes infrared illumination.

8. An input device, comprising:

a curved surface for detecting an object disposed on said curved surface;

an optical sensor for detecting movement of the object;

a light path capable of transferring an image of the object to said optical sensor, wherein said input device is capable of manipulating a cursor position; and a software subroutine capable of manipulating the cursor position by emulating rotational inertia based on the movement of the object on said curved surface;

wherein said input device is T-shaped and capable of being disposed between at least two individual keys of a keyboard.

9. The input device of claim 8 wherein said curved surface is dome shaped.

10. The input device of claim 8 wherein said input device is capable of detecting when the object is no longer disposed on said curved surface.

11. The input device of claim 10 wherein said input device locks the cursor position upon detecting when the object is no longer disposed on said curved surface.

12. The input device of claim 8 wherein said input device further includes an illumination source and wherein said curved surface is capable of being illuminated with said illumination source.

13. The input device of claim 12 wherein said illumination source comprises at least one visible color.

14. The input device of claim 12 wherein said illumination source includes infrared illumination.

15. An electronic device, comprising:

a screen capable of indicating cursor position;

a case attached to said screen;

the input device of claim 8 mounted to said case, wherein said input device is capable of manipulating said cursor position.

\* \* \* \* \*